US012420705B2

(12) United States Patent
Hayes et al.

(10) Patent No.: US 12,420,705 B2
(45) Date of Patent: Sep. 23, 2025

(54) PANABLE CAMERA WITH TRAILER LENGTH AND OBJECT DETECTION FOR MIRRORLESS VEHICLES

(71) Applicant: Bendix Commercial Vehicle Systems LLC, Avon, OH (US)

(72) Inventors: Thomas J. Hayes, Lakewood, OH (US); William R. Plow, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 22 days.

(21) Appl. No.: 18/373,390

(22) Filed: Sep. 27, 2023

(65) Prior Publication Data

US 2025/0100446 A1 Mar. 27, 2025

(51) Int. Cl.
*B60Q 9/00* (2006.01)
*B60R 1/25* (2022.01)
*H04N 23/695* (2023.01)

(52) U.S. Cl.
CPC .......... *B60Q 9/00* (2013.01); *B60R 1/25* (2022.01); *H04N 23/695* (2023.01); *B60R 2300/8093* (2013.01)

(58) Field of Classification Search
CPC ..... B60Q 9/00; B60R 1/25; B60R 2300/8093; B60R 1/26; H04N 23/695; G06V 10/44;

(Continued)

(56) References Cited

U.S. PATENT DOCUMENTS 9,374,562 B2 * 6/2016 Trombley ............ B62D 53/045
9,558,409 B2 * 1/2017 Pliefke .................... H04N 7/183
(Continued)

FOREIGN PATENT DOCUMENTS

DE 10 2015 218033 A1 3/2017
DE 10 2020 129455 A1 5/2022
(Continued)

OTHER PUBLICATIONS

International Search Report and Written Opinion, Sep. 20, 2024, pp. 1-14, issued in International Application No. PCT/US2024/035223, European Patent Office, Rijswijk, Netherlands.

(Continued)

*Primary Examiner* — Farzana Hossain
(74) *Attorney, Agent, or Firm* — Crowell & Moring LLP

(57) ABSTRACT

Embodiments are presented herein for a panable camera with trailer length and object detection for vehicles equipped with cameras to supplement or replace mirrors commonly used today. In one embodiment, a vehicle controller is provided comprising: one or more processors; a non-transitory computer-readable medium; and program instructions stored on the non-transitory computer-readable medium. The program instructions, when executed by the one or more processors, cause the one or more processors to: cause a side-view camera on a tractor to capture image(s) of leading, lower, upper and/or trailing edges of a trailer coupled with the tractor; and estimate a length of the trailer based on the image(s) captured by the side-view camera. Other embodiments are provided.

17 Claims, 3 Drawing Sheets

(58) Field of Classification Search
CPC ............... G06V 20/56; G06V 30/2247; B60W 2050/143; B60W 50/14; B60W 2300/14; B60W 2420/403; B60W 2422/95; B60W 2520/28; B60W 2530/201; B60W 2530/205; B60W 2540/18; B60W 2554/801

See application file for complete search history.

(56) References Cited

U.S. PATENT DOCUMENTS

| | | | |
|---|---|---|---|
| 9,963,004 | B2 | 5/2018 | Lavoie |
| 2014/0071278 | A1 | 3/2014 | Assaf |
| 2014/0085472 | A1 | 3/2014 | Lu et al. |
| 2017/0124881 | A1* | 5/2017 | Whitehead ............. G08G 1/167 |
| 2019/0375454 | A1 | 12/2019 | Kasaiezadeh Mahabadi et al. |
| 2021/0160433 | A1 | 5/2021 | Berne |
| 2022/0306060 | A1 | 9/2022 | Vikström et al. |
| 2023/0162509 | A1 | 5/2023 | DeLizo et al. |
| 2024/0181967 | A1* | 6/2024 | Berne .................. B62D 61/12 |
| 2025/0050849 | A1* | 2/2025 | Hayes .................. B60T 8/171 |
| 2025/0083602 | A1* | 3/2025 | Ma ...................... B60R 1/27 |

FOREIGN PATENT DOCUMENTS

| | | |
|---|---|---|
| EP | 2 949 532 B1 | 6/2022 |
| WO | WO 2011/042966 A1 | 4/2011 |
| WO | WO 2021/151516 A1 | 5/2021 |

OTHER PUBLICATIONS

International Search Report mailed Nov. 25, 2024 for International Application No. PCT/US2024/042056.

Written Opinion mailed Nov. 25, 2024 for International Application No. PCT/US2024/042056.

Bal, S.; "How Digital side view mirrors enhance driving safety?"; downloaded from the Internet on Sep. 26, 2023 at https://carbiketech.com/digital-side-view-mirrors-explained/; carbiketech.com; Dec. 12, 2018; 6 pages.

Bal, S.; "What Is Honda LaneWatch? All You Need To Know"; downloaded from the Internet on Sep. 26, 2023 at https://carbiketech.com/honda-lanewatch/; carbiketech.com; May 6, 2019; 5 pages.

Cole, S.; "Federal DOT FMCSA NHTSA Reflective Tape Requirements—Trucks Tractor Trailers"; downloaded from the Internet on Sep. 26, 2023 at https://reflectivetape.info/federal-dot-reflective-tape-requirements-for-trucks-and-tractor-trailers/#:~:text=Introduction%20%20Trucks%20exceeding%2010%2C000%20pounds,each%20side%20must%20be%20covered; "All About Reflective Tap" informational website; Reflective Inc.; Jan. 23, 2011; 3 Pages.

"ECFR § 571.108 Standard No. 108; Lamps, reflective devices, and associated equipment"; Code of Federal Regulations; Title 49, Subtitle B, Chapter V, Part 571, Subpart B; National Archives; Sep. 1, 2023; 168 pages.

Terzis, A. (Editor); Handbook of Camera Monitor Systems: The Automotive Mirror-Replacement Technology based on ISO 16505, vol. 5: Augmented Vision and Reality; SpringerNature, Springer International Publishing AG Switzerland; ISBN 978-3-319-29609-8; 2016; 539 pages.

"§ 571.3 Definitions," from the Code of Federal Regulations, Title 49, Subtitle B, Chapter V, Part 571, Subpart A; downloaded from the Internet on Aug. 10, 2023 at https://www.ecfr.gov/current/title-49/subtitle-B/chapter-V/part-571/subpart-A/section-571.3; National Archives; Aug. 1, 2023; 5 pages.

"Bendix® Wingman® Fusion™"; Advanced Driver Assistance System product page; downloaded from the Internet on Aug. 10, 2023 at Bendix® Wingman® Fusion™ | Bendix Commercial Vehicle Systems; Bendix CVS; 5 pages.

"MirrorEye®: replace truck mirrors with a camera system"; Product page; downloaded from the Internet on Aug. 10, 2023 at MirrorEye®: replace truck mirrors with a camera system (orlaco.com); Stoneridge; Orlaco; 5 pages.

* cited by examiner

PANABLE CAMERA WITH TRAILER LENGTH AND OBJECT DETECTION FOR MIRRORLESS VEHICLES

BACKGROUND

Some heavy-duty commercial vehicles configured for towing a trailer can be equipped with one or more cameras. For example, a camera can be used as a supplement or replacement for front and/or side mirrors to allow a driver to see the side of the vehicle.

SUMMARY

The following embodiments generally relate to vehicles equipped with cameras to supplement or replace mirrors commonly used today. In one embodiment, a vehicle controller is provided comprising: one or more processors; a non-transitory computer-readable medium; and program instructions stored on the non-transitory computer-readable medium. The program instructions, when executed by the one or more processors, cause the one or more processors to: cause a side-view camera on a tractor to capture image(s) of leading, lower, upper and/or trailing edges of a trailer coupled with the tractor; and estimate a length of the trailer based on the image(s) captured by the side-view camera.

In another embodiment, a method is provided that is performed in a vehicle comprising a tractor, a trailer towed by the tractor, and at least one image capture device. The method comprises: capturing image(s) of the trailer using the at least one image capture device; and analyzing the image(s) of the trailer to estimate a length of the trailer.

In yet another embodiment, a tractor is provided comprising: at least one image capture device; and means for estimating a length of a trailer towed by the tractor based on images of leading, lower, upper and/or trailing edges of the trailer that are captured by the at least one image capture device.

Other embodiments are possible, and each of the embodiments can be used alone or together in combination.

DETAILED DESCRIPTION

Figure 1:
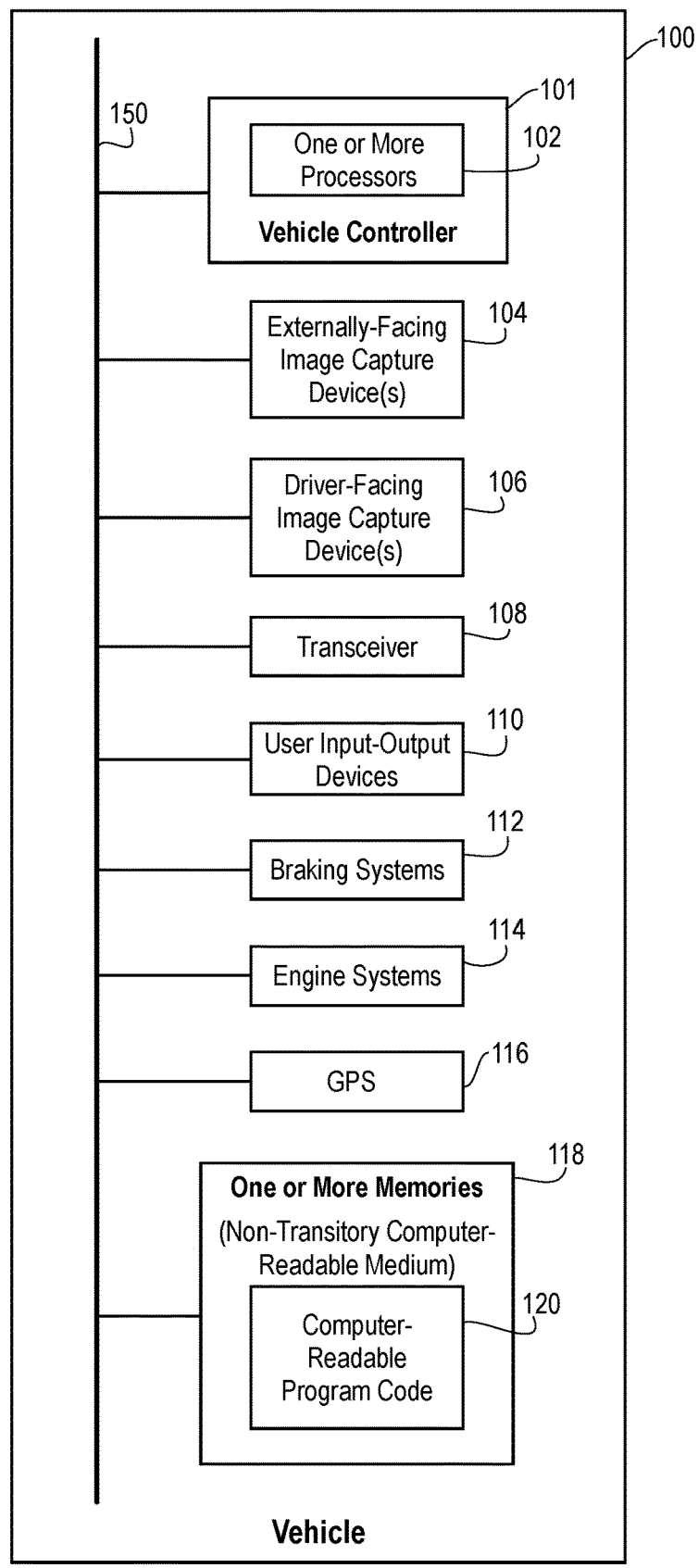
FIG. 1 is a block diagram of components of a vehicle of an embodiment.

Turning now to the drawings, FIG. 1 is a block diagram of example components of a vehicle 100 of an embodiment. In one embodiment, the vehicle 100 is an on/off road vehicle as described by NHTSA Title 49, Subtitle B, Chapter V, Part 571, Subpart A, Section 571.3, where the vehicle can be one or more of the following in sensible combinations: "Truck", "Truck tractor", "Trailer", "Full trailer", "Trailer converter dolly", "Semitrailer", and/or "Pole trailer." A "cab" will sometimes be referred to herein where a cab is the portion of a tractor where the vehicle operator typically controls the vehicle. Further details of the typical or required inputs and outputs provided to a vehicle operator are not the subject of this patent.

As shown in FIG. 1, the vehicle 100 in this example comprises one or more of the following: a vehicle controller 101 comprising one or more processors 102, externally-facing image capture device(s) (e.g., camera(s)) 104, driver-facing image capture device(s) 106, a transceiver 108, user input-output (IO) devices 110 (e.g., a microphone, a speaker, a touchscreen, indicator lights, etc.), a braking system 112, an engine system 114, a global positioning system (GPS) 116 that can identify a location of the vehicle, and one or more memories 118. An image capture device can be any device capable of digitizing an image (e.g., camera, LIDAR, radar, ultrasound, etc., or any combination thereof). In one embodiment, the externally-facing image capture device 104 is a replacement/supplement to a front mirror and/or side mirror(s). Also, the vehicle 100 can have other devices, including, but not limited to, forward-facing cameras, radars, lidars, and environmental sensors.

These various components can be in communication with each other directly or indirectly (through components that may or may not be shown or described herein) via wired (e.g., controller area network (CAN), ethernet, automotive ethernet, power line communication (PLC), etc.) or wireless (e.g., WiFi, Bluetooth, cellular, etc.) connections. In the example in FIG. 1, the components are directly or indirectly connected via a bus 150, which can take the form of a controller area network (CAN).

The one or more memories 118 (e.g., one or more non-transitory computer-readable medium) store computer-readable program code 120. These one or more memories 118 can be the same type or different types and can be part of the same memory device or be different memory devices. For example, some or all of the memories in the one or more memories 118 can be volatile or non-volatile non-transitory memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof.

The one or more processors 102 can execute the computer-readable program code 120, which can have instructions (e.g., modules, routines, sub-routine, programs, applications, etc.) that, when executed by the one or more processors 102, cause the one or more processors 102 to perform certain functions, such as those discussed herein, as well as other functions not described herein. It should be noted that the one or more processors 102 can have different functions (e.g., a first subset of one or more processors can be used for certain functions, while a second subset of one or more processors can be used for other certain functions). The one or more processors 102 can also take the form of a purely-hardware implementation (e.g., an application-specific integrated circuit (ASIC)).

As mentioned above, some heavy-duty commercial vehicles configured for towing a trailer can be equipped with one or more cameras. For example, the externally-facing camera(s) 104 can be used as a replacement for side mirror(s) to allow a driver to see the side(s) of the vehicle or can augment a side mirror. The following embodiments take advantage of this technological shift away from traditional mirrors to camera-based systems to provided additional functions not previously possible. Such functions can include trailer length and object detection, as discussed below.

Currently, it is difficult for a driver to gauge the length of a trailer when the driver is in the cab using only traditional, mechanical side mirrors. Also, it can be difficult for a driver to adjust mechanical mirrors when the driver is inside the cab. So, it can be difficult for a driver to maintain an optimal view if the vehicle configuration changes by adding or removing trailers. In addition, a traditional mirror does not allow for any kind of additional details to be displayed on its surface to inform the driver of possible events of importance.

The following embodiments leverage the use of cameras as side-view mirrors, which can be on a sturdy and fixed point on the side of the cab. In one embodiment, the side mirror has two different modes of operation to gauge the length of trailers depending on the technology used in the camera system. For example, if the camera has a wide viewing angle, the camera can pan digitally to show only the area of interest to the driver inside the cab (e.g., on screens mounted on the A pillar). However, if the camera does not have a wide viewing angle, it can pan mechanically to the same point of interest, displaying this area to the driver inside the cab. In a two-camera system (e.g., one on the driver side and one on the passenger side), as the cameras pan, they know their position on the side of the truck and will be able to determine the angle of their pan once they view the trailing edge of a trailer.

The processor(s) 102 can then use a trigonometry calculation to determine the length of the trailer in view. The processor(s) 102 can repeat this task if there are multiple trailers towed, each time stopping to record the length of the observed trailer. Once all the trailers are accounted for, the cameras can position themselves in a position (e.g., the ideal position) to maintain as much road view as possible, adjusting to the change of the vehicle system, as needed.

In one embodiment, upon key-on or upon a detected change in the vehicle system indicating the addition or removal of a trailer, the side mirror cameras can begin to pan from their at-rest positions until a first trailing edge is detected. The processor(s) 102 can calculate the length of one trailer and then move onto calculating the length of a second trailer, if present. Once all of the trailers are measured, the cameras can position themselves (e.g., as commanded by the processor(s) 102) to a certain viewing angle (e.g., an ideal viewing angle) and monitor this area, communicating pertinent information to the driver.

Figure 2:
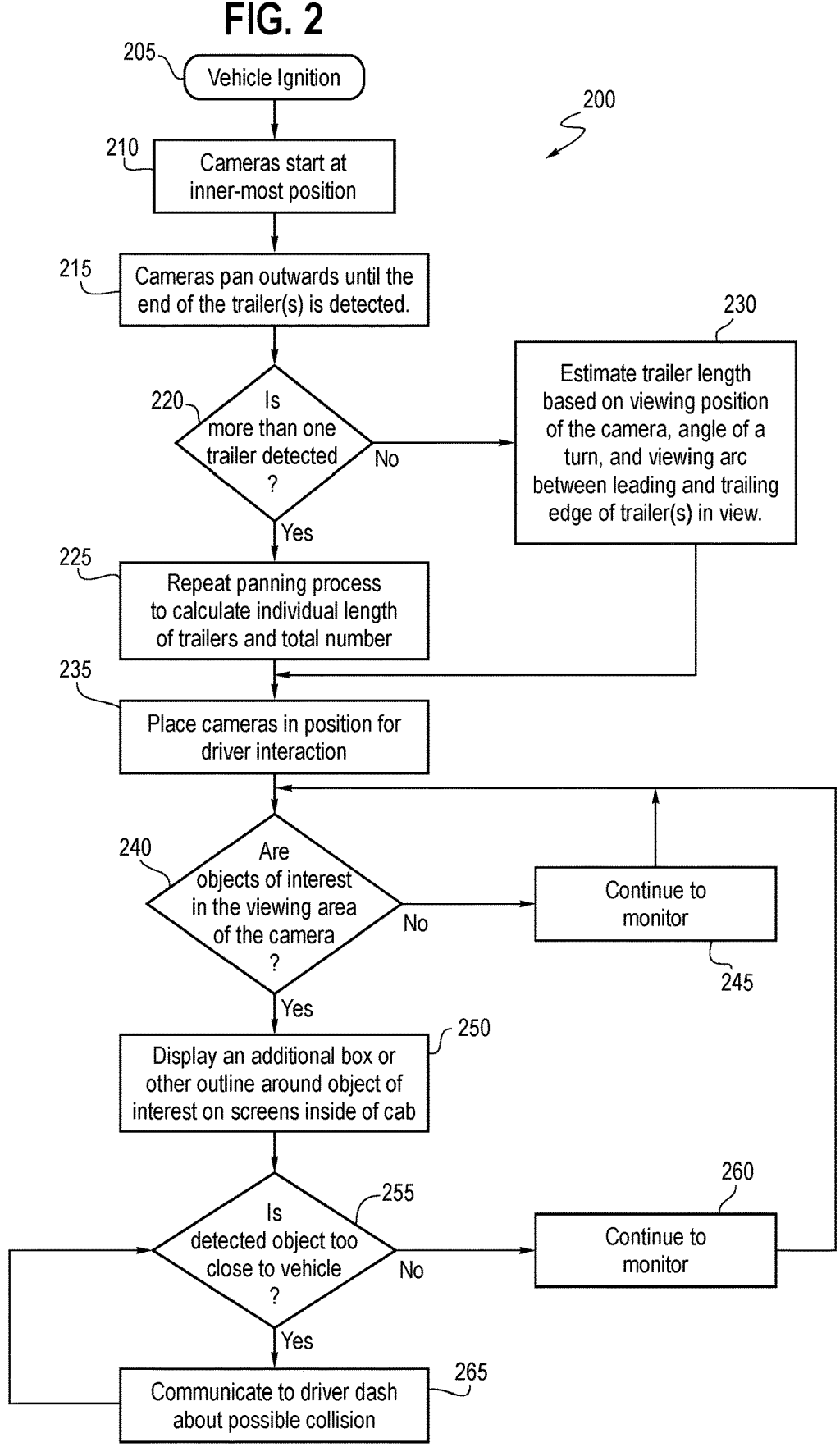
FIG. 2 is a flow chart of a method of an embodiment for trailer length and object detection.

FIG. 2 is a flow chart 200 of a method of an embodiment for trailer length and object detection. As shown in FIG. 2, after vehicle ignition (act 205), the cameras (e.g., one camera as the driver-side mirror and the other as the passenger-side mirror) on the vehicle start at their initial (e.g., inner-most) position (act 210). Then, the cameras pan outwards until the end of the trailer(s) is detected (act 215) (the panning can be mechanical or digital with a high-resolution camera). Image processing by the processor(s) 102 can identify key characteristics that can include, but are not limited to, leading vertical edge of the trailer, trailing vertical edge of the trailer, lower horizontal edge of the trailer marked with reflective tape, lower horizontal edge of the trailer marked with "scaled" reflective tape, lower horizontal edge of the trailer without reflective tape, optical character recognition (OCR) of trailer dimensions marked in predetermined location of the trailer (e.g., at the front and/or side of the trailer), a quick response (QR) or bar code describing trailer dimensions, and/or a QR or bar code identifying the trailer in a database.

Next, the processor(s) 102 can determine if more than one trailer is detected (act 220). If more than one trailer is detected, the panning process is repeated to calculate the individual length of the trailer and the total number of trailers (act 225). If more than one trailer is not detected, the processor(s) 102 can estimate the trailer length based on a viewing position of the camera, the angle of a turn, and the viewing arc between the leading and trailing edges of the trailer(s) in view (act 230). The angle of the turn can be determined by configuration and sensor inputs, which can include, but are not limited to, steer angle sensor, wheel speeds, slope of the vehicle, wheel base, and/or wheel track.

Next, the cameras are placed in a position (e.g., an optimal position) for driver interaction (act 235). The processor(s) 102 can then determine if an object of interest (e.g., people, cars, motorcycles, debris, etc.) is in the viewing angle of the camera (act 240). Object size, position, and relative velocities can be scaled in relation to trailer size, position, and velocity. If objects of interest are not in the viewing angle of the camera, the processor(s) 102 continue monitoring the viewing angle of the camera (act 245). However, if an object of interest is in the viewing angle of the camera, the processor(s) 102 can display an additional box, outline, or other indicia around or near the object of interest on the screen(s) inside the cab of the vehicle (act 250).

The processor(s) 102 can then determine if the object is detected to be too close to the vehicle (e.g., within a certain threshold distance) (act 255). If the processor(s) 102 determine that the object is not too close to the vehicle, the processor(s) 102 can continue the monitoring process (act 260). However, if the processor(s) determine that the object is too close to the vehicle, the processor(s) 102 can communicate to the driver dash about a possible collision (act 265).

The following is an example of a method to measure a trailer length with a single camera. It should be noted that this is merely one example and that other implementations can be used. Also, while this example is illustrated in terms of a single camera, other methods can use more than one camera.

Figure 3:
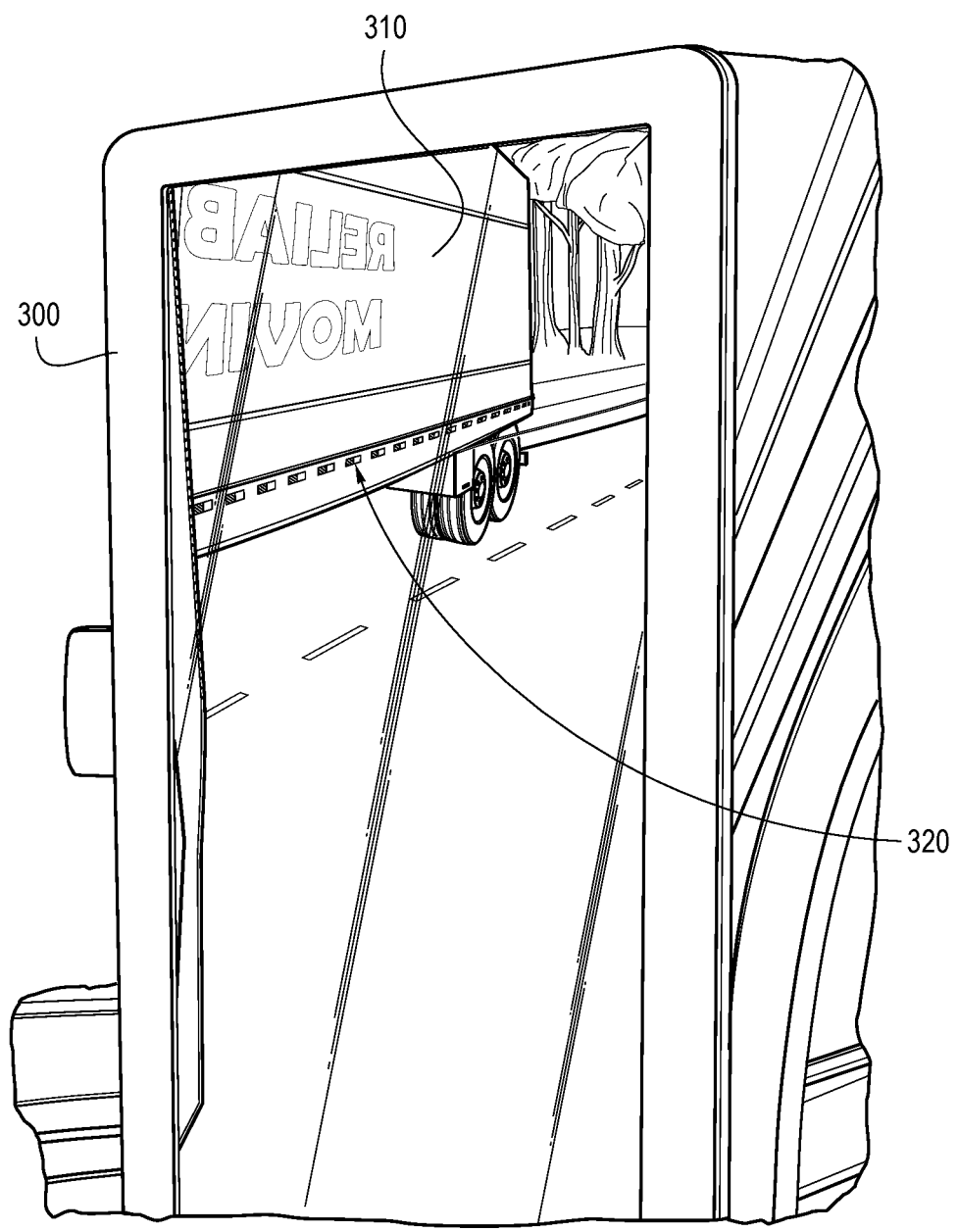
FIG. 3 is an illustration of a display screen of an embodiment displaying an image from a side-view camera.

This example method will be discussed in conjunction with FIG. 3, which shows a display screen 300 that is displaying the output of a driver-side camera. The display screen 300 is inside the cab of the vehicle, and the displayed output shows the trailer 310 of the vehicle. The lower edge of the trailer 310 is marked with reflective tape 320 (e.g., DOT C2 reflective tape that alternates white and red and looks silvery in the daytime), which is commonly used for trailer classification for commercial vehicles exceeding 10,000 pounds and over 80 inches wide. (The DOT C2 tape has a standard height of two inches, and that standard height can be used to establish the length of the trailer, which would not be the case if the tape had an unknown, non-standard height.)

The processor(s) 102 can analyze the displayed image for the height in pixels of the reflective tape 320 at the nearest point and furthest points in the image. In this example, there is a transition ratio of two inches as the image is processed along the lower edge of the trailer 310. In a first pass, the total number of pixels from the beginning of the trailer edge in view to the end of the trailer edge in view are counted and recorded as a critical pixel for the lower trailer edge measurement. A pixel ratio factor can be determined by the following equation:

$$\text{Pixel\_Ratio\_Factor} = \frac{\text{\# of pixels for 2" height at front of trailer}}{\text{\# of pixels for 2" height at rear of trailer}} \div \text{total}$$

\#of pixels on lower edge of trailer

The distance between two pixels at the nearest edge (front) of the trailer 310 can be calculated and recorded by the following equation:

$$\text{pixel}_{front} = 2" \div \text{\#of pixels for height at rear of trailer}$$

In a second pass, the processor(s) 102 can process the image by counting the critical pixels identified as the lower trailer edge from the beginning of the trailer edge in view to the end of the trailer edge in view. The distance between each pair of two pixels can be calculated and totaled as shown in the following equation:

$$\text{Trailer Length} = \sum_{x=0}^{pixels-1} \text{pixel}_{front} + x \cdot \text{Pixel\_Ratio\_Factor}$$

It should be noted that this method assumes that the image is captured with sufficient detail (e.g., number of pixels) to produce a result without significant error. Lower resolution images may require that more pixels be inserted/interpreted. Alternatively, multi-pixel steps can be used instead of single-pixel steps. Further, this method demonstrates only one example technique for a single camera to analyze an image of a trailer and determine its length using image analysis. As noted above, other techniques can be used. Additionally, the estimated length can be utilized with parameters of the brake controller. Also, the calculated length of the trailer can be adjusted to account for the pivot point of the trailer image as this can represent the kingpin location on the trailer. The determined length can be considered as the length from the position of the tractor-trailer fifth wheel connection.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A vehicle controller comprising:
   one or more processors;
   a non-transitory computer-readable medium; and
   program instructions stored on the non-transitory computer-readable medium that, when executed by the one or more processors, cause the one or more processors to:
   cause a side-view camera on a tractor to pan until a leading edge of a trailer coupled with the tractor is detected;
   cause the side-view camera to capture an image of the leading edge of the trailer;
   cause the side-view camera to further pan until a trailing edge of the trailer is detected;
   cause the side-view camera to capture an image of the trailing edge of the trailer, and
   estimate a length of the trailer based on viewing positions of the side-view camera when the images of the leading and trailing edges of the trailer were captured by the side-view camera.

2. The vehicle controller of claim 1, wherein the program instructions, when executed by the one or more processors, further cause the one or more processors to:
   detect an object of interest captured by the side-view camera; and
   display, on a display device, indicia near a display of the object of interest.

3. The vehicle controller of claim 2, wherein the program instructions, when executed by the one or more processors, further cause the one or more processors to:
   determine whether the object of interest is within a threshold distance of the vehicle; and
   in response to determining that the object of interest is within the threshold distance of the vehicle, generate a driver alert.

4. The vehicle controller of claim 1, wherein the length of the trailer is also estimated based on an angle of a turn, and/or a viewing arc between the leading and trailing edges of the trailer.

5. The vehicle controller of claim 4, wherein the angle of the turn is determined from an output of a steer-angle sensor, an output of a wheel-speed sensor, a slope of the vehicle, an identification of a wheel base, and/or an identification of a wheel track.

6. The vehicle controller of claim 1, wherein:
   the vehicle comprises at least one additional trailer coupled with the tractor; and
   the program instructions, when executed by the one or more processors, further cause the one or more processors to:
   cause the side-view camera on the tractor to capture image(s) of leading and trailing edges of the at least one additional trailer; and
   estimate length(s) of the at least one additional trailer based on the image(s) of the at least one additional trailer captured by the side-view camera.

7. The vehicle controller of claim 1, wherein the side-view camera is configured to mechanically pan.

8. The vehicle controller of claim 1, wherein the side-view camera is configured to digitally pan.

9. The vehicle controller of claim 1, wherein the program instructions, when executed by the one or more processors, further cause the one or more processors to:
   cause a second side-view camera on the tractor to capture image(s) of leading and trailing edges of the trailer; and
   estimate the length of the trailer based on the image(s) captured by the second side-view camera.

10. A method comprising:
    performing in a vehicle comprising a tractor, a trailer towed by the tractor, and an image capture device:
    causing the image capture device on the tractor to pan until a leading edge of the trailer is detected;
    causing the image capture device to capture an image of the leading edge of the trailer;

causing the image capture device to further pan until a trailing edge of the trailer is detected;

causing the image capture device to capture an image of the trailing edge of the trailer; and estimating a length of the trailer based on viewing positions of the image capture device when the images of the leading and trailing edges of the trailer were captured by the image capture device.

11. The method of claim 10, further comprising:

displaying, on a display device, indicia near a display of a detected object of interest.

12. The method of claim 11, further comprising:

generating an alert in response to the object of interest being within a threshold distance of the tractor or trailer.

13. The method of claim 10, wherein the image capture device comprises a side-view camera.

14. The method of claim 13, wherein the side-view camera is positioned on a driver-side of the vehicle, and wherein the vehicle comprises an additional side-view camera positioned on a passenger-side of the vehicle.

15. A tractor comprising:

at least one image capture device; and means for:

causing the at least one image capture device on the tractor to pan until a leading edge of a trailer towed by the tractor is detected;

causing the at least one image capture device to capture an image of the leading edge of the trailer;

causing the at least one image capture device to further pan until a trailing edge of the trailer is detected;

causing the at least one image capture device to capture an image of the trailing edge of the trailer; and estimating a length of the trailer based on viewing positions of the image capture device when the images of the leading and trailing edges of the trailer were captured by the at least one image capture device.

16. The tractor of claim 15, further comprising:

means for displaying, on a display device, indicia near a display of a detected object of interest.

17. The tractor of claim 16, further comprising:

means for generating an alert in response to the object of interest being within a threshold distance of the tractor or trailer.

* * * * *